United States Patent [19]
Levitan

[11] Patent Number: 6,027,001
[45] Date of Patent: Feb. 22, 2000

[54] WAGON HARNESS

[76] Inventor: Gregg Levitan, 225 Antlers Dr., Rochester, N.Y. 14618

[21] Appl. No.: 09/252,447

[22] Filed: Feb. 18, 1999

[51] Int. Cl.[7] ....................................................... A45F 3/14
[52] U.S. Cl. .......................... 224/184; 280/1.5; 296/97.21
[58] Field of Search ................................ 224/184; 182/3; 119/907; 280/1.5; 296/97.4

[56] References Cited

U.S. PATENT DOCUMENTS

| | | | |
|---|---|---|---|
| 2,996,228 | 8/1961 | Bauman | .................................... 224/184 |
| 4,396,091 | 8/1983 | Anderson . | |
| 4,424,040 | 1/1984 | Buchheister et al. . | |
| 4,478,311 | 10/1984 | Anderson | ...................................... 182/3 |
| 5,010,850 | 4/1991 | Sailer | ......................................... 119/96 |
| 5,351,654 | 10/1994 | Fuentes . | |
| 5,370,286 | 12/1994 | Newman . | |
| 5,375,861 | 12/1994 | Gifford . | |
| 5,401,070 | 3/1995 | Le Pelley . | |
| 5,411,461 | 5/1995 | Thomascik . | |
| 5,503,894 | 4/1996 | Brown . | |
| 5,531,494 | 7/1996 | Singleton . | |
| 5,622,294 | 4/1997 | Evans . | |

FOREIGN PATENT DOCUMENTS

| | | |
|---|---|---|
| 74064 | 10/1948 | Norway . |
| 209 | of 1870 | United Kingdom . |
| 2713 | of 1890 | United Kingdom . |

*Primary Examiner*—Gregory M. Vidovich
*Assistant Examiner*—Maerena W. Brevard

[57] ABSTRACT

A harness for pulling a child's wagon or cart which is worn around the waist of an individual having a length of tensile rope material with padding material around the circular end-portion contacting the wearer's waist. The tensile rope material terminates in two looped distal ends, with each end having a spring-link to allow direct attachment to a wagon or by passing the looped distal ends through a wagon handle and back attaching each spring-link to its respective strand of rope material extending behind the individual. The circular end-portion is adjusted and held securely behind the user's waist by looping fastening material around the padding material encircling the rope material. Binding mach adjacent to washers covering each distal end of rubber padding secure and allow adjustment of the padding material along the length of rope material. The harness allows a user freedom of movement by enabling the user to free up the hands to walk naturally while pulling the child's wagon or cart.

12 Claims, 4 Drawing Sheets

WAGON HARNESS

CROSS-REFERENCE TO RELATED APPLICATIONS

Not applicable.

BACKGROUND-FIELD OF INVENTION

This invention relates to a harness for pulling wheeled vehicles, and more particularly to a harness for pulling a wheeled child's toy such as a wagon or cart.

BACKGROUND OF THE INVENTION

Children's wagons or similar size carts are available in various sizes and models. Such wagons or similar size carts are ordinarily used to pull children or cargo. Individuals normally reach back to pull the wheeled vehicle, which can cause discomfort from the awkward position of reaching back and not being able to walk naturally. An individual pulling a wagon or cart in this manner may also experience discomfort due to their height from bending over, arm fatigue from pulling the wagon, and uneasiness from trying to hold the wagon away from the body. Thereby, pulling a wagon or cart for a reasonable amount of time or distance would be burdensome.

Various pulling devices have been described in prior art. U.S. Pat. No. 5,401,070 to LePelley (1995) discloses an article for pulling a child toy; however, the strap does not free up the hands to allow the individual to walk naturally. U.S. Pat. No. 5,531,494 to Singleton (1996) discloses a handle for control of mobile riding toys so that even though an individual can remain erect and have a more comfortable posture, the handle still has to be held. Thus, the individual does not have complete freedom of movement here, too.

Another type of harness is U.S. Pat. No. 4,396,091 to Anderson (1983) that provides only one means of attachment to a movable object. The use of only one rope attachment to a wagon handle does not provide the additional stability and guidance in pulling a wagon that two rope attachments can furnish. Furthermore, an over the shoulder harness does not have the convenience and comfort of a harness that only has to be worn around the waist. If the shoulder harness is not worn properly, shoulder strain can occur.

Still another example, U.S. Pat. No. 5,375,861 to Gifford (1994) discloses a baby stroller that allows hands free movement while pulling a baby stroller, nevertheless it is not specific to wagons or carts.

Yet another example, U.S. Pat. No. 5,411,461 to Thomascik (1995) discloses a belt with web loops that allow connecting to a tow line. The disadvantage here is that additional material such as a tow line has to be acquired in order for the belt to function as a towing device.

Other examples have been provided in the prior art that may be adapted to pulling children's wagons or carts. However, they are more expensive to fabricate and cannot be easily as worn or adapted to pulling children's wagons or carts.

The present invention contemplates the need for a harness that is simple to fabricate, easy to use, and provides hands free movement to walk naturally while pulling a child's wagon or cart.

BRIEF SUMMARY OF THE INVENTION

In accordance with the present invention, a harness worn around the waist of an individual to aid in pulling a child's wagon or cart. The harness comprises a tensile rope material with padding material around the circular end-portion contacting the wearer's waist and terminates in two looped distal ends, with each end having a spring-link.

OBJECTS AND ADVANTAGES

The objects and advantages of the present invention are:

(a) to provide a harness that aids in pulling a child's wagon or cart;

(b) to provide a harness to allow a user freedom of movement while pulling a child's wagon or cart;

(c) to provide a harness that reduces discomfort from the awkward position of reaching back by providing an easier more natural method of pulling a child's wagon or cart;

(d) to provide a harness that frees up the hands to allow an individual to walk naturally while pulling a child's wagon or cart;

(e) to provide a harness that furnishes additional stability and guidance by using two rope attachments on a child's wagon or cart handle;

(f) to provide a harness that affixes securely to the handle of a child's wagon or cart by the use of spring-links attached to the looped distal ends of the harness;

(g) to provide a harness that fits comfortably around the user's waist; and (h) to provide a harness that is adjustable to fit around an individual's waist that fits firmly without the addition of a shoulder harness.

Further objects and advantages are to provide a harness which is simple and inexpensive to manufacture, which is easy to use, which can be manufactured of tensile rope material of various lengths and which can be easily folded or hung for storage purposes. Still other objects and advantages of the invention will become apparent from a consideration of the following description and drawings.

---

REFERENCE NUMERALS IN DRAWINGS

Figure 1:
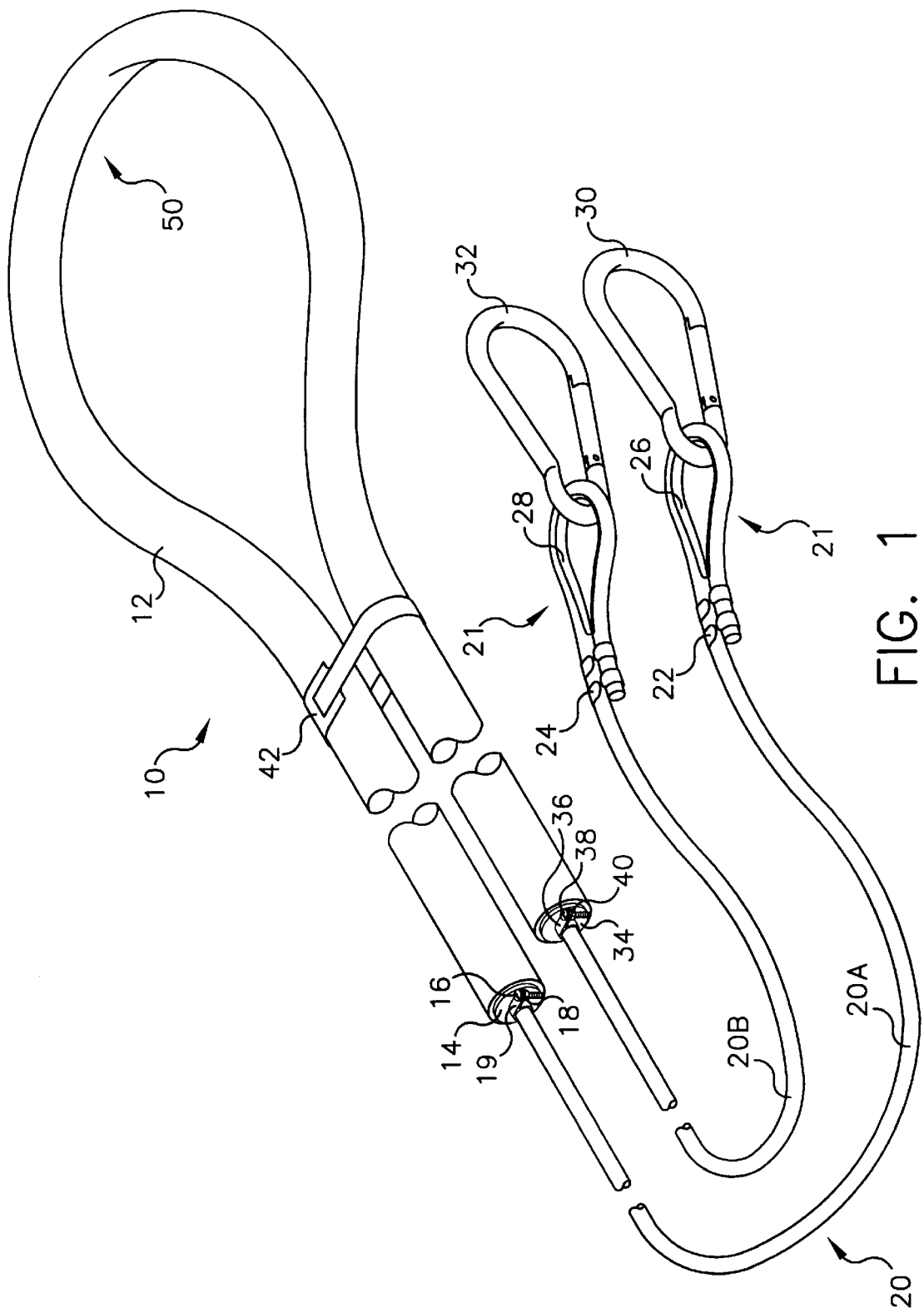
FIG. 1 is a perspective view of the wagon harness according to the invention.

| | |
|---|---|
| 10 | wagon harness |
| 12 | padding material |

-continued

REFERENCE NUMERALS IN DRAWINGS

| | |
|---|---|
| 14 | washer |
| 16 | bolt |
| 18 | nut |
| 19 | binding mach |
| 20 | tensile rope material |
| 20A | tensile rope material |
| 20B | tensile rope material |
| 21 | looped distal end |
| 22 | clamp |
| 24 | clamp |
| 26 | thimble |
| 28 | thimble |
| 30 | spring-link |
| 32 | spring-link |
| 34 | washer |
| 36 | binding mach |
| 38 | bolt |
| 40 | nut |
| 42 | fastening strap |
| 44 | spring-snap |
| 46 | wagon |
| 48 | individual |
| 50 | circular end-portion |
| 52 | wagon handle |

DETAILED DESCRIPTION OF THE INVENTION

Referring now to the drawings, a preferred embodiment of the harness of the present invention is illustrated in FIG. 1. The harness 10 comprises a length of tensile rope material 20 terminating in two looped distal ends 21 formed by means of thimbles 26 and 28, and secured by clamps 22 and 24. In the preferred embodiment, the rope material 20 is plastic, such as polypropylene, and can be brightly colored material for easier visibility, and may vary in length from 3 meters to 4.5 meters depending on the height and waist size of the individual.

Figure 2:
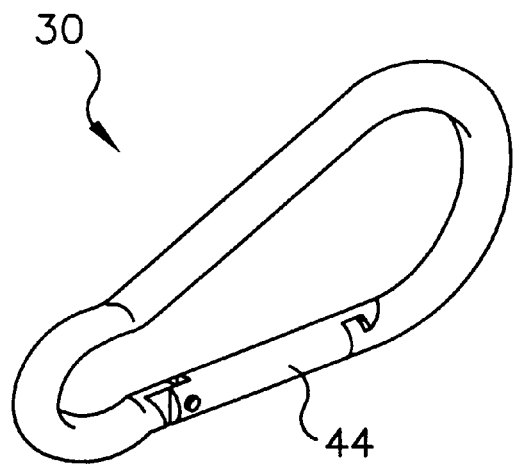
FIG. 2 is a plan view of a spring-link.
Figure 3:
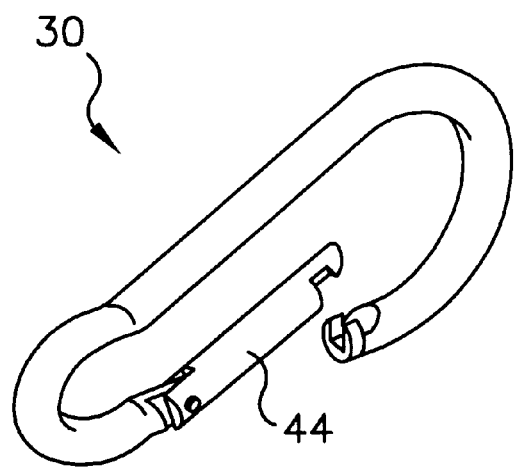
FIG. 3 is a perspective view of a spring-link with the spring snap shown in an open position for clarity.
Figure 4:
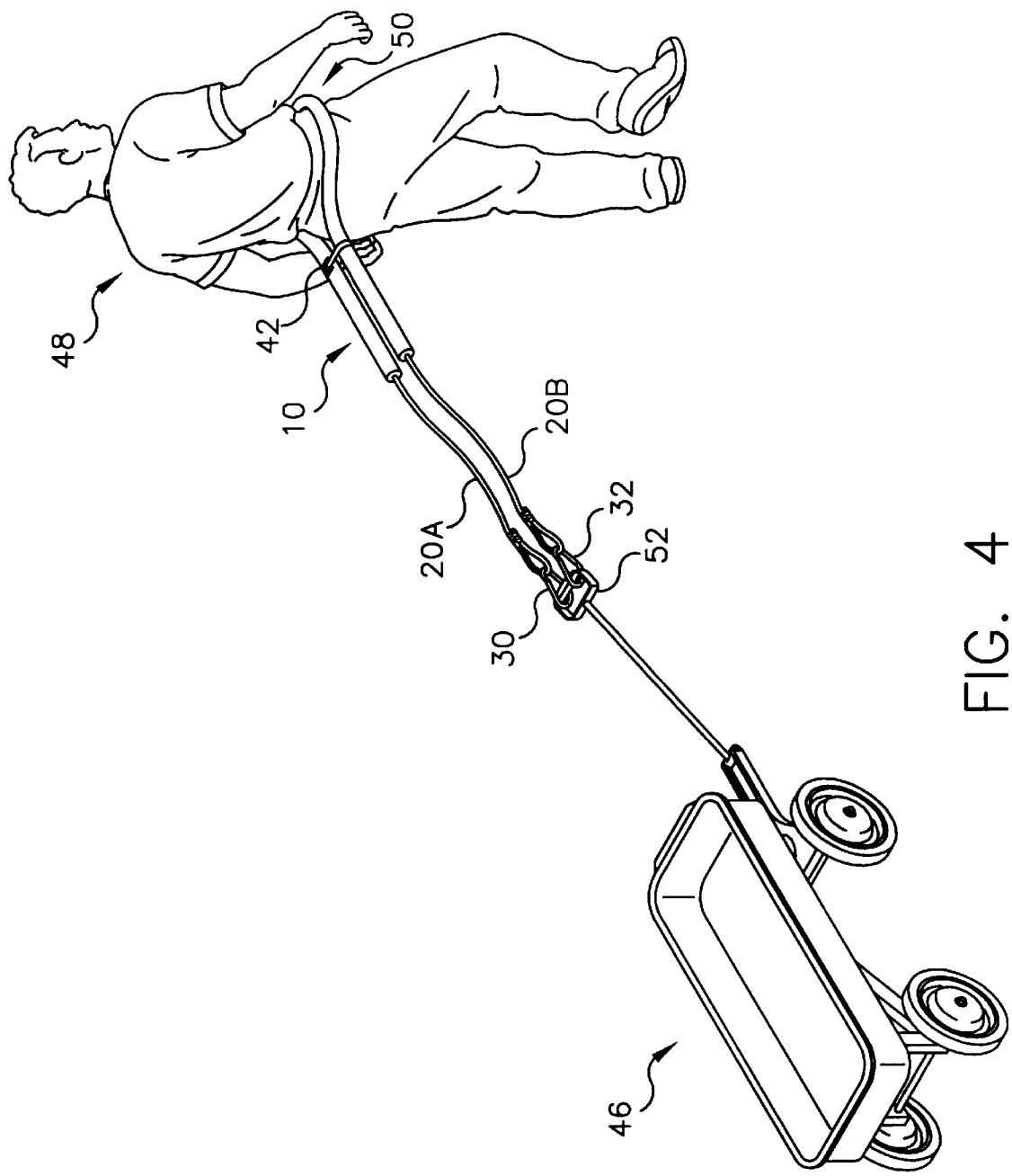
FIG. 4 is a perspective view of the wagon harness according to the invention being worn around the waist of the user and attached to a wagon handle in one useful configuration.
Figure 5:
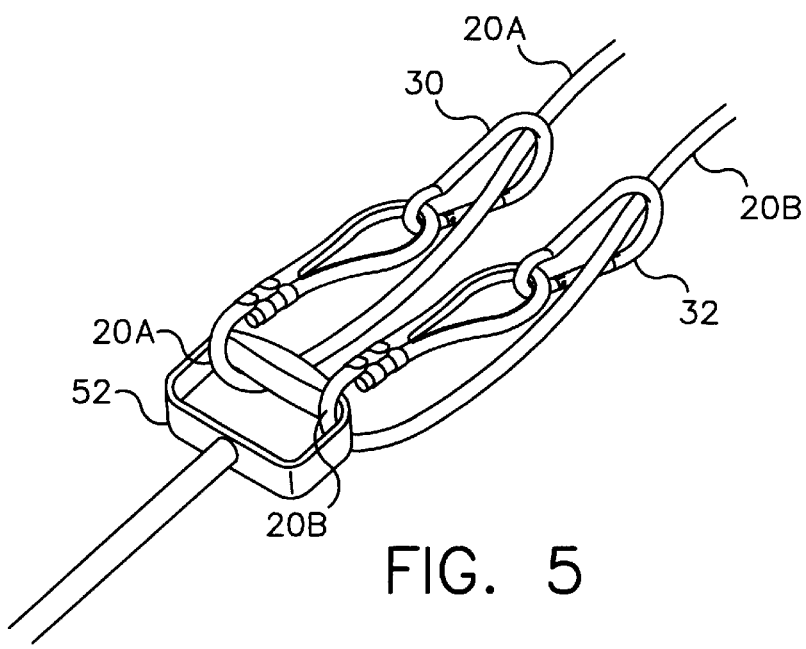
FIG. 5 illustrates a second configuration and use of the harness attached to a wagon handle.

FIG. 1 illustrates two spring-links 30 and 32 that are attached to the respective looped ends 21 of tensile rope material 20. FIG. 2 illustrates a plan view of spring-link 30, which may vary in size depending upon how the harness is attached to a wagon handle 52 of a wagon 46 as illustrated in FIGS. 4 and 5. FIG. 3 illustrates spring-link 30 with a spring snap 44 in an open position. The use of spring-link 30 will be referred to later on.

Figures 6, 7:
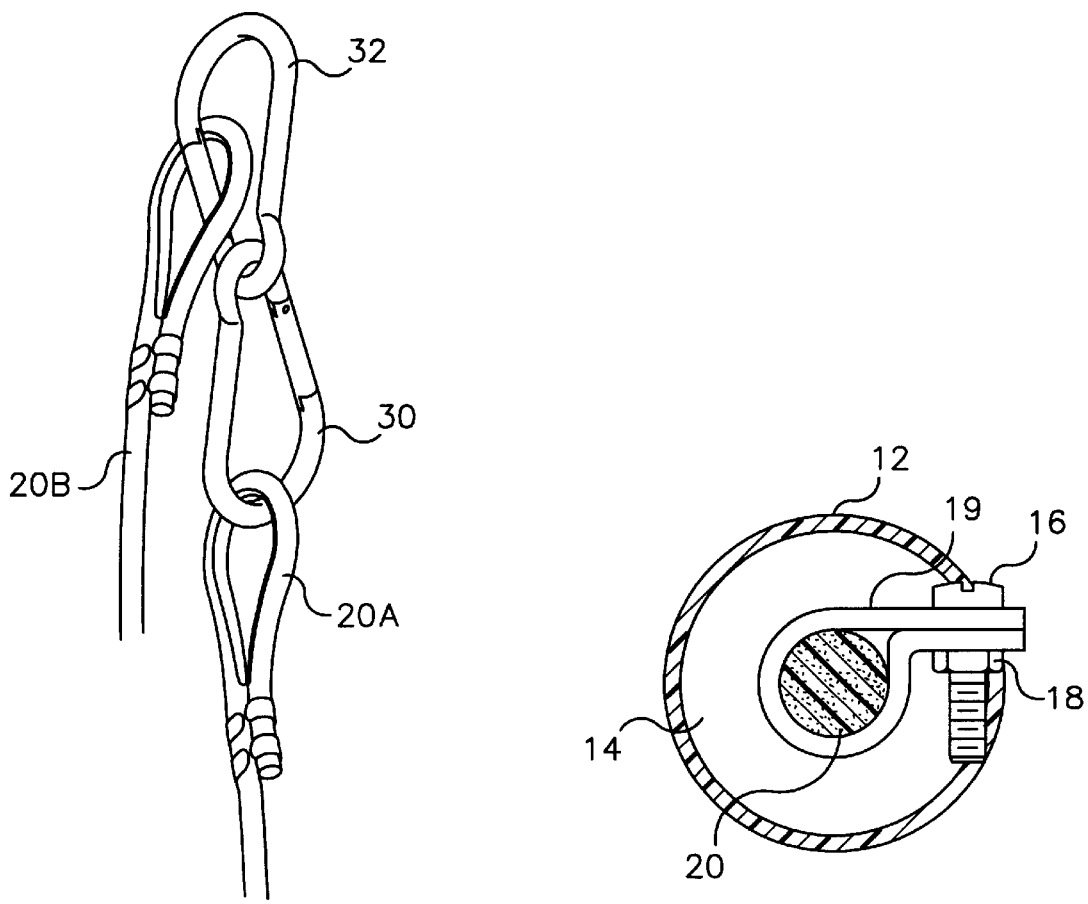
FIG. 6 illustrates a third configuration and use of the harness utilizing one spring-link.
FIG. 7 is a side view of the tensile rope material passing out a distal end of padding material through the center hole of a washer in front of the distal end of padding material encircling the tensile rope material and behind a binding mach, with a nut and a bolt connection, surrounding the tensile rope material of the present invention.

Referring again to FIG. 1, the rope material 20 passes through a length of padding material 12 and washers 14 and 34 adjacent to the distal ends of padding material 12. The washers 14 and 34 allow rope material 20 to pass through their center while being of sufficient diameter to extend over the opening of the distal ends of padding material 12. Washers 14 and 34 are held securely against the distal ends of padding material 12 by clamping the rope material 20 with a binding mach 19 adjacent to washer 14 and with a binding mach 36 adjacent to washer 34. Binding mach 19 is tightened with a bolt 16 and a nut 18 and binding mach 36 is tightened with a bolt 38 and a nut 40. In the preferred embodiment, binding mach 19 and 36 is nylon. FIG. 7 illustrates a cross sectional view of rope material 20 passing through the center hole of washer 14 adjacent to and in front of a distal end of padding material 12 encircling rope material 20 and in back of binding mach 19 tightened with bolt 16 and nut 18. In the preferred embodiment, washers 14 and 34 are rubber and bolts 16 and 38 and nuts 18 and 40 are nylon. The binding mach 19 and 36 by each distal end of padding material 12 can be loosened to allow movement of padding material 12 and each adjacent washer along the length of rope material 20 to permit adjustment according to the needs of the individual as illustrated in FIG. 4. In the preferred embodiment, the padding material 12 is a flexible soft material such as foam or polyethylene. In one form, this padding material may comprise circular pipe insulation material such as foam or polyethylene.

The harness is worn around the waist of the individual 48 as illustrated in FIG. 4. The rope material 20 with padding material 12 forms a circular end-portion 50 contacting the wearer's waist, that is held together by a fastening strap 42 as illustrated in FIGS. 1 and 4. In the preferred embodiment, strap 42 comprises Velcro® hook on one side and Velcro® pile on the opposite side that loops around padding material 12 encircling rope material 20, to form the circular end portion 50 around the wearers waist and parallel rope strands 20A and 20B that terminate in the looped distal ends. Nevertheless, the fastening strap can be red or other colors for visibility and other attaching material that contacts the rubber padding 12 and fastens securely to avoid sliding backward when an individual moves forward wearing the harness and pulling a wagon.

FIG. 4 illustrates one method in which the harness 10 of the present invention can be used by the individual 48 to pull the wagon 46. Harness 10 is extended around the waist of the individual with padding material 12 contacting the wearer's waist. Harness 10 is adjusted and secured on the wearer's waist by fastening strap 42. Fastening strap 42 is wrapped around padding material 12 encircling the parallel strands of tensile rope material 20A and 20B extending back behind the wearer's waist. Strap 42 can be adjusted anywhere along the two parallel strands of padding material 12 behind the individual's waist depending on the waist size and comfort of the individual. The advantage of this arrangement is that padding 12 and strap 42 create enough friction so that when strap 42 is securely wrapped around padding 12, strap 42 will remain in place. Once strap 42 is securely wrapped around the parallel strands of padding 12, the individual can either wear the harness by bringing up the circular end-portion passed the legs or down over the head and trunk to the waist and readjust strap 42 if necessary.

In the embodiment depicted in FIG. 4, the harness 10 attaches to the wagon handle 52 directly by means of spring-links 30 and 32 at the respective looped distal ends 21 of parallel rope strands 20A and 20B. An example of spring-link 30 is illustrated in FIGS. 2 and 3 in the closed and open position, respectively. Various sizes of spring-links can be used to attach the harness to the wagon handle directly depending on the size and shape of the wagon handle. In a preferred embodiment, spring-links 30 and 32 may have openings from 10 to 19 millimeters.

FIG. 5 illustrates the preferred embodiment of attachment of the harness 10 of FIGS. 1 and 4 to the wagon handle 52. The parallel rope strands 20A and 20B terminating in the looped distal ends 21 are passed through the wagon handle opening and then doubled back upon themselves, whereby looped ends 21 are then connected to rope strands 20A and 20B by means of spring-links 30 and 32, respectively. In this manner, harness 10 as shown in FIGS. 1 and 4 can be attached to any size or shape wagon handle, as best seen in FIG. 5.

FIG. 6 illustrates an alternative embodiment of connecting parallel rope strands 20A and 20B for storage purposes. Spring links 30 and 32 connect to each other forming a link so that spring-link 30 can be used to hang the harness 10 as shown in FIG. 1 when not in use.

Accordingly, the reader will see that the wagon harness of the invention can be used to pull a child's wagon or cart easily, by allowing freedom of movement to walk naturally and fitting comfortably and adjusting readily around the user's waist. In addition, the wagon harness can quickly and securely attach to any size or shape wagon handle.

While the above description contains numerous specificities, these should not be taken as limiting the scope of the invention, but as examples of preferred embodiments of the invention. It will be understood by those skilled in the art that modifications and changes could be made to the present invention without deviating from the spirit of the invention.

Thus the above description and illustration should not be taken as limiting the scope of the invention that is defined by the appended claims.

I claim:

1. A harness worn around the waist of a user for pulling a child's wagon or cart without the use of one's hands or upper body, said harness comprising:

a) a length of tensile rope material having a first looped distal end and a second looped distal end;

b) a first engaging means for securing said first looped distal end and a second engaging means for securing said second looped distal end;

c) a padding material encircling a portion of said rope material of sufficient length to extend around and behind the waist of a user, said padding material having a first distal end opening and a second distal end opening for receiving said rope material therethrough;

d) a first end of said padding material secured along said portion of rope material by a first securing means, said first securing means having a first nut and a first bolt connection; a first washer positioned between said first securing means and said first distal opening, thereby covering the first distal opening and allowing said rope material to pass freely therethrough;

e) a second end of said padding material secured along said portion of rope material by a second securing means, said second securing means having a second nut and a second bolt connection; a second washer positioned between said second securing means and said second distal opening, thereby covering the second distal opening and allowing said rope material to pass freely therethrough;

f) a fastening means having a band of sufficient length to loop around adjacent lengths of said padding material for securing and adjusting the harness around the waist of a user;

g) a first and second attaching means for respectively connecting said first and second looped distal ends securely to the handle of a child's wagon or cart.

2. The harness of claim 1, wherein said length of tensile rope material is brightly colored.

3. The harness of claim 1, wherein said length of tensile rope material is polypropylene.

4. The harness of claim 1, wherein said length of tensile rope material is from 3 meters to 4.5 meters.

5. The harness of claim 1, wherein said first engaging means and said first securing means of said first looped distal end and said second engaging means and said second securing means of said second looped distal end, respectively, are each comprised of a thimble and clamp arrangement.

6. The harness of claim 1, wherein said padding material is composed of foam pipe insulation material.

7. The harness of claim 1, wherein said padding material is composed of polyethylene.

8. The harness of claim 1, wherein said first washer and said second washer are rubber.

9. The harness of claim 1, wherein said first securing means and said second securing means are nylon binding mach.

10. The harness of claim 1, wherein said first nut and said first bolt connecting said first securing means and said second nut and said second bolt connecting said second securing means, respectively, are plastic.

11. The harness of claim 1, wherein said fastening means is composed of hook material on one side and loop material on the opposite side.

12. The harness of claim 1, wherein said first attaching means connecting to said first looped distal end and said second attaching means connecting to said second looped distal end, respectively, is a spring-link.

* * * * *